United States Patent
Anderson et al.

(12)
(10) Patent No.: US 6,662,692 B2
(45) Date of Patent: Dec. 16, 2003

(54) LUG WRENCH SUPPORT

(76) Inventors: Jerome John Anderson, 233 Wilderness Dr., Fairbanks, AK (US) 99712; Ruth Ann Baker, 233 Wilderness Dr., Fairbanks, AK (US) 99712

(*) Notice: Subject to any disclaimer, the term of this patent is extended or adjusted under 35 U.S.C. 154(b) by 0 days.

(21) Appl. No.: 10/046,052

(22) Filed: Jan. 15, 2002

(65) Prior Publication Data

US 2003/0131696 A1 Jul. 17, 2003

(51) Int. Cl.[7] .............................................. B25B 23/00
(52) U.S. Cl. ................................................. 81/462; 7/100
(58) Field of Search ............................. 81/462, 177.2, 81/180.1; 7/100; 254/131

(56) References Cited

U.S. PATENT DOCUMENTS

| | | | | |
|---|---|---|---|---|
| 2,504,345 A | * | 4/1950 | Nellis | 7/100 |
| 2,619,320 A | * | 11/1952 | Miller | 7/100 |
| 3,555,583 A | * | 1/1971 | Mousel | 7/100 |
| 3,649,976 A | * | 3/1972 | Isom | 7/100 |
| 4,619,161 A | * | 10/1986 | Reynolds | 81/462 |
| 5,613,411 A | * | 3/1997 | Rines | 81/462 |
| 5,910,198 A | * | 6/1999 | Maher et al. | 81/462 |
| 5,967,005 A | * | 10/1999 | deVore et al. | 81/462 |

* cited by examiner

Primary Examiner—D. S. Meislin

(57) ABSTRACT

The present invention is directed toward a road side lug nut removal and tightening tool, which may also be used to lift a tire back onto the axle of a car, or truck. The tool comprises a frame, with a slideable plate having apertures arranged in a circular configuration. The apertures are aligned with the configuration of the lug nuts on a wheel, enabling a lug wrench to be coupled to a lug nut and corresponding aperture of the plate. A hollow extension bar may be connected to the lug wrench to apply additional leverage. By laying the frame horizontally on the ground, the hollow extension bar may be placed under lift brackets attached to the frame, enabling the frame to be used as a lever to lift a tire onto the axle of a car, or truck.

13 Claims, 5 Drawing Sheets

LUG WRENCH SUPPORT

FIELD OF INVENTION

The present invention is directed to a road side lug nut removal and tightening tool. The tool may also be used to lift a tire onto the axle of a car, or truck.

BACKGROUND

Many people have had a flat tire while driving their vehicle, and as a result have had to change a tire along the side of the road. However, it is often difficult to loosen the lug nuts as mechanics have a tendency to put the lug nuts on very tight (for safety reasons), and as lug nuts often get rusty. As a result, it is often necessary for the person changing the tire to get down on their knees in an effort to remove the lug nuts. When replacing the tire the person changing the tire may slide the wheel onto the lug bolts and as a result, disfigure the threads on the lug bolts. Problems also occur as the person changing the tire may find the tire too heavy, and as a result find it very difficult to put the tire back onto the lug bolts. As such, it is an object of the present invention to make it possible for a person to change a tire without requiring the person to get on their knees in an effort to either remove or tighten the lug nuts, or to lift the spare tire back onto the axle.

Lug wrenches are often used to remove lug nuts when flat tires occur. However, the physical strength required to turn lug wrenches is often too great, and while attempting to turn the lug wrench the person risks twisting their back. As the lug wrench is a very common tool to aid in tire changing, it is an object of the present invention to provide an apparatus, which incorporates the lug wrench. It is a further object of the present invention to provide a tool that not only provides additional leverage to remove the lug nuts, but also can aid in lifting a tire back onto the axle.

SUMMARY OF THE INVENTION

The present invention is a tire changing aid to be used in conjunction with a lug wrench. The tire changing aid comprises a wrench support, a hollow extension bar, and lift brackets. The wrench support includes left and right brackets that are slidably mounted to the arc-shaped frame of the wrench support. The left and right brackets are equipped to secure a plate with apertures in a circular pattern that may align with the lug nuts of the tire to be changed. To remove or tighten lug nuts, the lug wrench is placed on one of the lug nuts and through the aligning aperture. The hollow extension bar has a slot at one end, which is then placed over a torque member of the lug wrench and used as a lever.

One advantage of the present invention is that it makes it easy to tighten and loosen lug nuts by an extension of the lug wrench, which gives the user four times the leverage of the lug wrench alone. A further advantage of the extension is that it allows the person changing the tire to use their body weight, rather than a twisting motion, to remove and tighten the lug nuts thus reducing the chance of injury.

The wrench support of the present invention may also be used as a lever to lift a spare tire back onto an axle by attaching the lift brackets to the wrench support, and placing the hollow extension bar under the lift brackets to be used as the fulcrum. As such, it is an object of the present invention to not only make removal and tightening of the lug nuts easy, but also to make it easy to place a tire onto the lug bolts. Still a further advantage of the present invention is that all movements are in a downward motion, thus reducing both the risk of injury and strength requirements. In addition, the person changing the tire is not required to get down on his or her knees.

A variety of plates may be used that are suitable for different tire lug configurations. As such a further advantage of the present invention is that since the plates are removable the present invention is suitable for all automobiles up to one-ton trucks, with single wheels. Still a further advantage of the present invention is that it may be stowed in a compact position, such that the parts will not become lost.

BRIEF DESCRIPTION OF THE DRAWINGS

Further features and advantages of the invention will be apparent from the following detailed description, given by way of example, of a preferred embodiment taken in conjunction with the accompanying drawings, wherein.

DETAILED DESCRIPTION OF THE INVENTION

Figure 1:
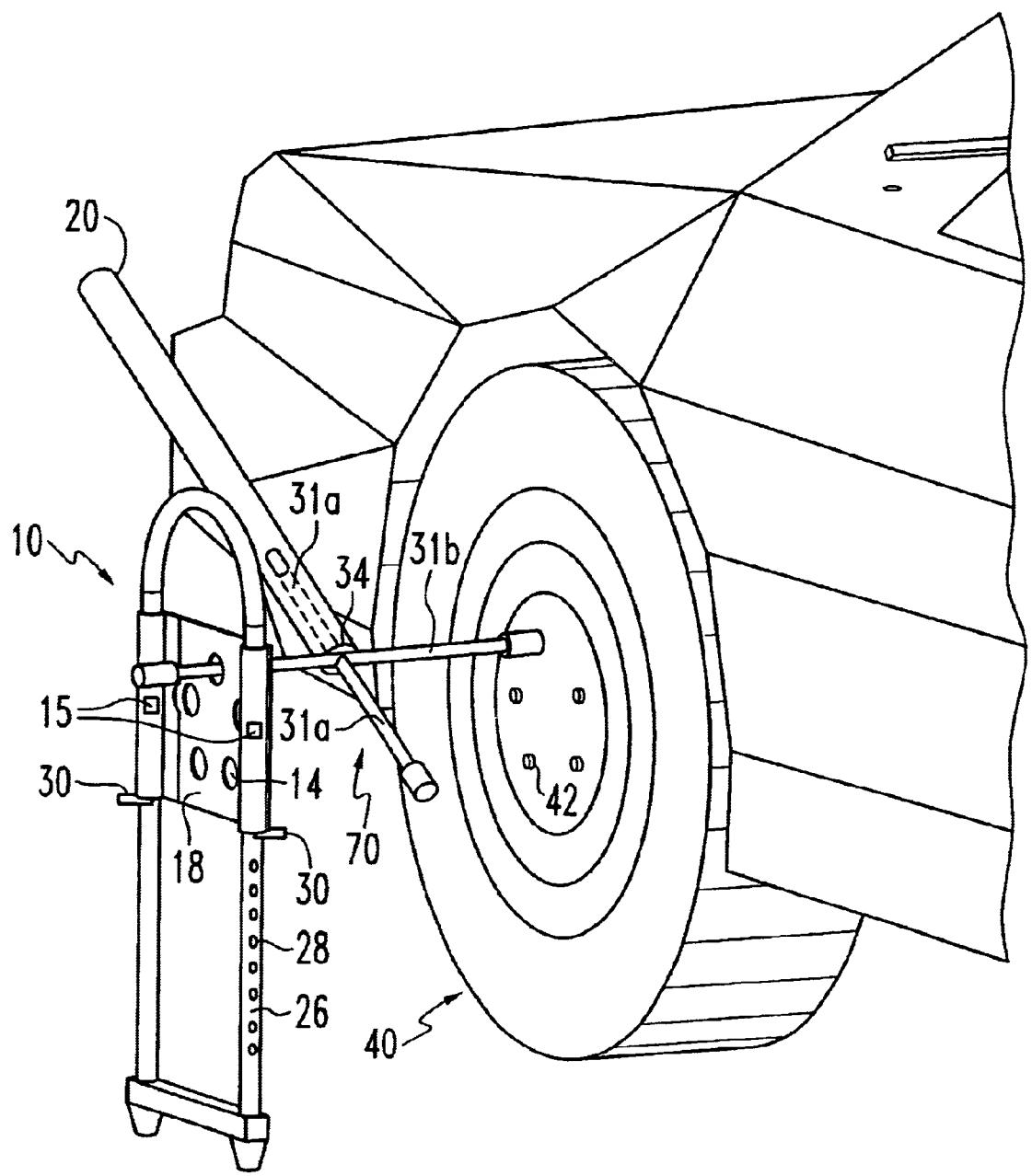
FIG. 1 is a schematic of the assembled tool.

Referring to FIG. 1 the wrench support 10 supports a lug wrench 70. A hollow extension bar 20 attaches to the lug wrench 70 for leverage.

Figure 2:
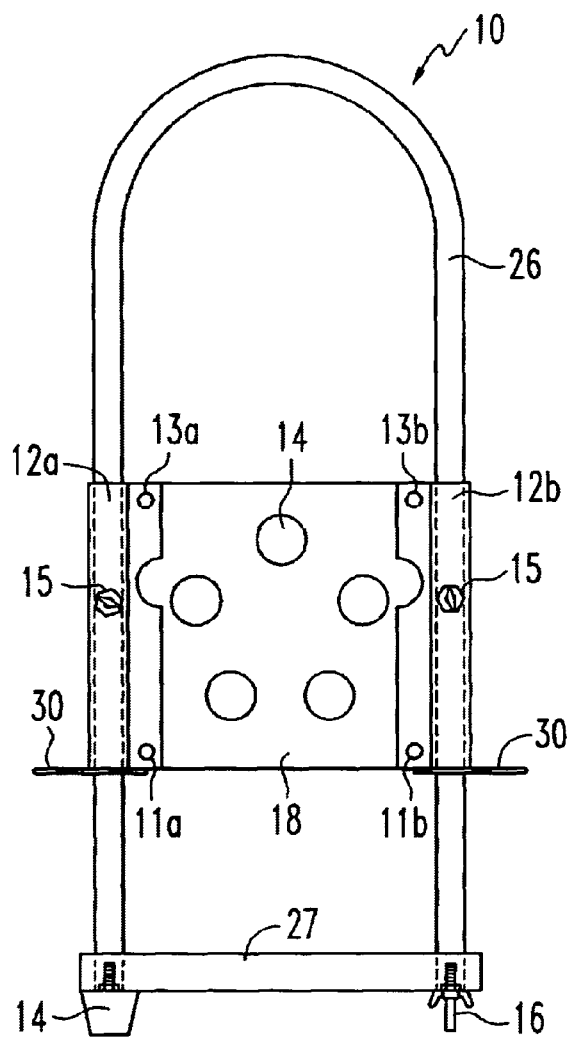
FIG. 2 is a front view of the wrench support.
Figure 3:
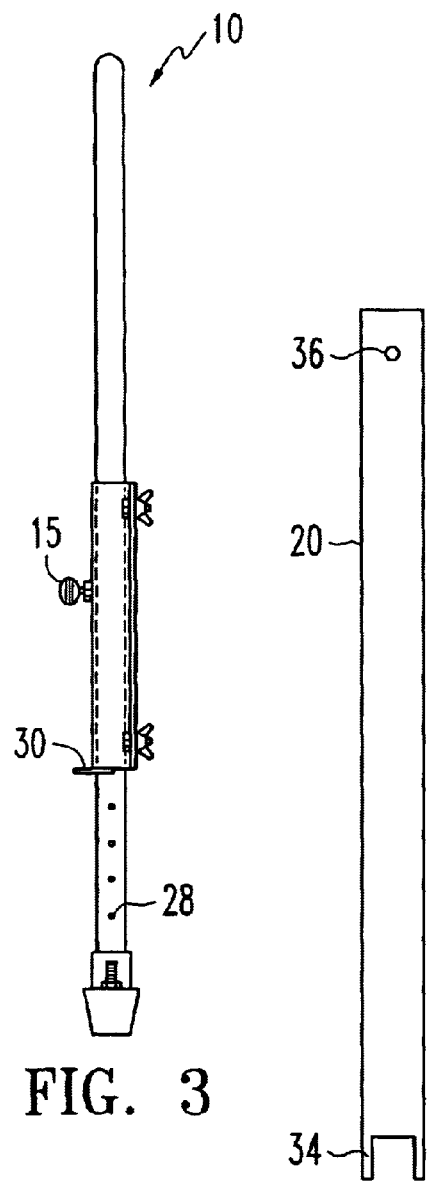
FIG. 3 is a side view of the wrench support.
Figure 4:
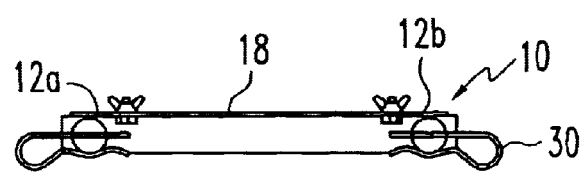
FIG. 4 is a top view of the assembled wrench support.

Referring to FIGS. 2, 3, and 4 the wrench support 10 consists of an arc shaped frame 26 with a base 27. FIG. 2 illustrates that attached to the base 27 may be rubber pads 14, or ice penetrating tongs 16 to ensure the frame does not slip on a variety of surfaces. A left bracket 12a and right bracket 12b are slidably connected to the frame 26. The left and right brackets 12a and 12b each have two screw holes 13a and 13b, and lower screw holes 11a and 11b that are used for the attachment of a plate 18. The plate 18 has five apertures in a circular pattern 14 designed to align with the pattern of lug nuts on a tire. The left and right brackets 12a and 12b may move up and down the frame 26 such that the apertures 14 of the plate 18 may align with the tire lug nuts.

The left and right brackets 12a and 12b are tightened to the frame 26 by thumb bolts 15. In addition, pin holes 28 are located on the outer sides of the frame 26 for the insertion of safety pins 30 to ensure the left and right brackets 12a and 12b are in a secured position.

Figure 5:
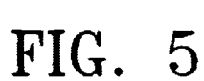
FIG. 5 is a front view of the hollow extension bar.

Referring to FIG. 5 the hollow extension bar 20 is shown. The hollow extension bar is tubular and hollow, and has a lift bracket attachment hole 36 drilled through the hollow extension bar 20 at one end and a slot 34 at the other end. Referring to FIG. 1, as the extension bar 20 is hollow it may fit over a torque member 31a of lug wrench 70, and the slot 34 may then fit over the straight member 31b of the lug wrench 70 to enable the hollow extension bar 20 to act as a lever.

Figure 6:
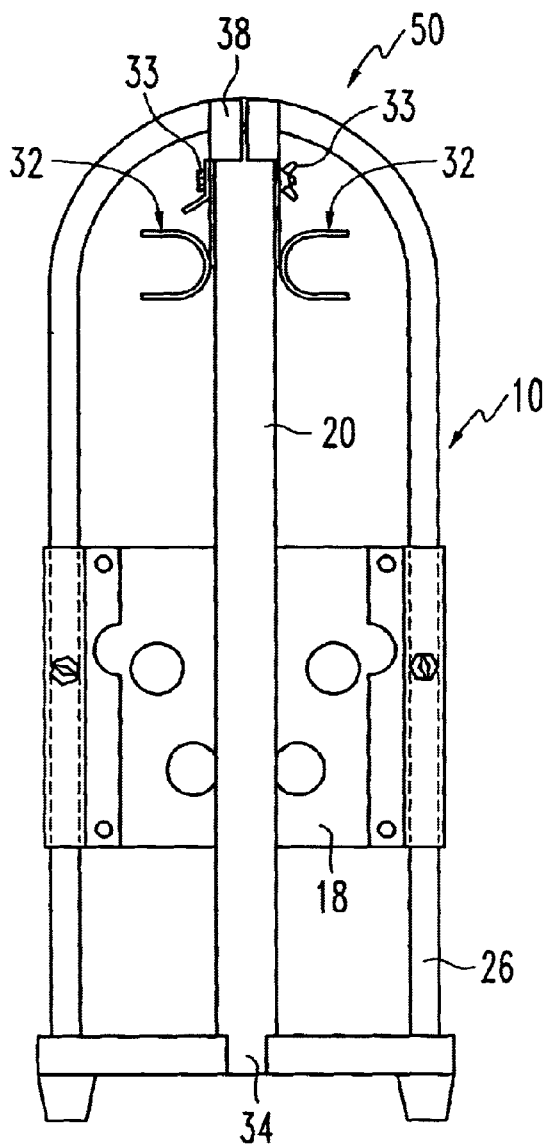
FIG. 6 is a front view of the wrench support and hollow extension bar in the stowed position.
Figure 7:
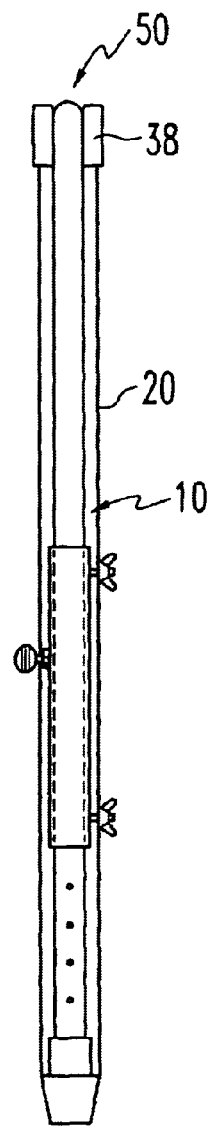
FIG. 7 is a side view of the wrench support and hollow extension bar in the stowed position.
Figure 13:
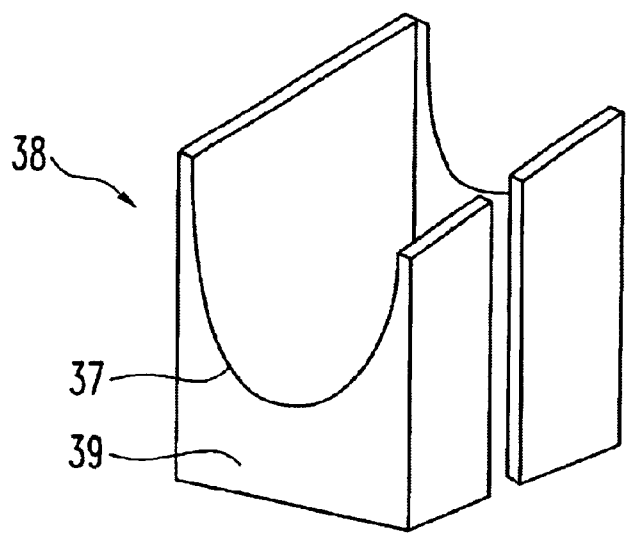
FIG. 13 is a perspective view of the coupler.

Referring to FIGS. 6 and 7 the wrench support 10 and hollow extension bar 20 are shown in the stowed configuration 50. A bag (not shown) is stored in the hollow extension bar 20 to hold extra bolts, and safety pins 30 when the wrench support 10 and hollow extension bar 20 are in the stowed configuration. The semi-circular edge 37 of the coupler 38 (see FIG. 13) is fitted against the top of the frame 26 to enable the end opposite the slot 34 of the hollow extension bar 20 to fit within the brim 39 of the coupler 38 (see FIG. 13) while the slot 34 of the hollow extension bar fits over the base 27 to securely attach extension bar 20 to the wrench support 10 when stowed. The lift brackets 32 as described below support the brim 39.

Figure 11:
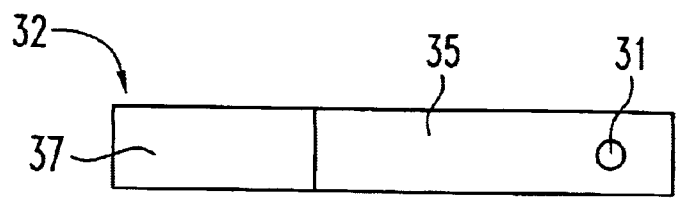
FIG. 11 is a top view of a lift bracket.

Referring to FIG. 11, each lift bracket 32 has a hole 31. As shown in FIG. 6, the flat portion 35 (see FIG. 11) of the lift bracket 32 may be placed on either side of the hollow extension bar 20 with the hole 31 aligned with the lift bracket attachment hole 36. A wing nut and bolt 33 connects the lift brackets 32 to the hollow extension bar 20 by placing the wing nut and bolt 33 through the holes 31 of the lift brackets 32 located on either side of the extension bar 20 and the lift bracket attachment hole 36. The use of the lug nut and bolt 33 as described above enables the end of the plat portion 35 opposite the arc 37 to support the brim 39 of the coupler 38 such as shown in FIG. 6.

Figure 8:
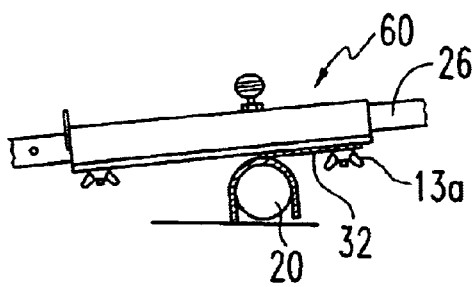
FIG. 8 is a detailed schematic of the tool in wheel lift configuration.
Figure 9:
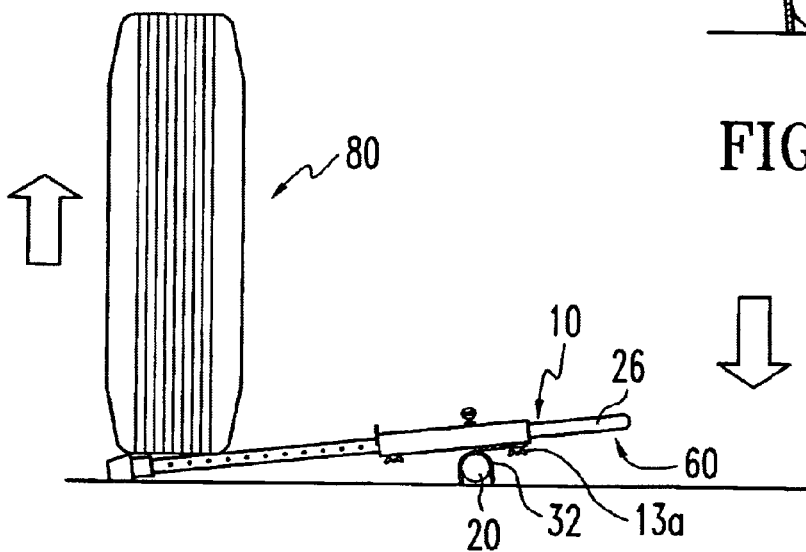
FIG. 9 is a schematic of the tool in wheel lift configuration being used to lift a tire.
Figure 12:
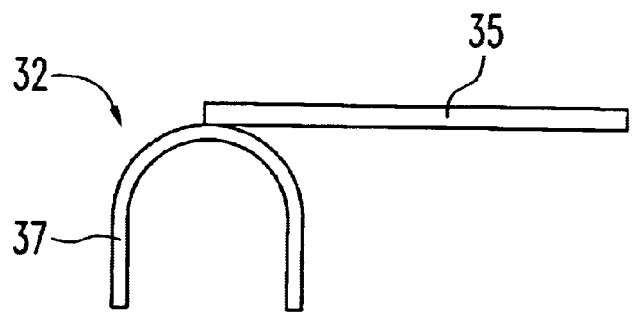
FIG. 12 is a side view of a lift bracket.

Referring to FIGS. 8 and 9 the wrench support 10 is shown in the wheel lift configuration. The upper screw holes 13a and 13b or 11a and 11b are aligned with holes 31 to enable the lift brackets 32 to be connected to the left and right brackets 12a and 12b using screws. The hollow extension bar 20 is then placed under the arc 37 of the lift brackets 32 (see FIG. 12). The upper end of the frame 26 may then undergo downward foot pressure, such that the frame 26 may lift a tire 70 onto an axle.

Figure 10A:
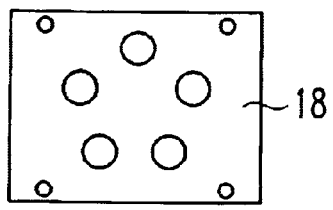
FIG. 10a is a front view of an adjustable 5-lug bolt plate for the wrench support.
Figure 10B:
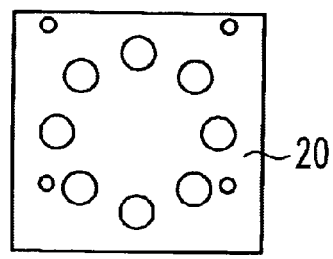
FIG. 10b is a front view of an adjustable 8-lug bolt plate for the wrench support.
Figure 10C:
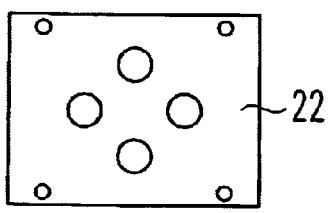
FIG. 10c is a front view of an adjustable 4-lug bolt plate for the wrench support.
Figure 10D:
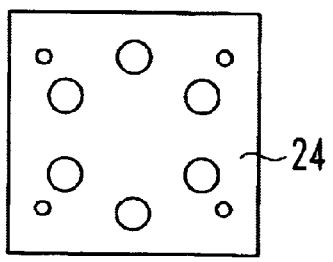
FIG. 10d is a front view of an adjustable 6-lug bolt plate for the wrench support.

Referring to FIGS. 10a–d the plates to attach to the frame 26 of the wrench support 10 are interchangeable to correspond with the number of lug nuts of the wheel. FIG. 10a is a front view of an adjustable 5-lug bolt plate 18 for the wrench support. FIG. 10b is a front view of an adjustable 8-lug bolt plate 20 for the wrench support. FIG. 10c is a front view of an adjustable 4-lug bolt plate 22 for the wrench support. FIG. 10d is a front view of an adjustable 6-lug bolt plate 24 for the wrench support.

Method of Changing a Tire

Referring to FIG. 6, when the wrench support tool is not in use it will be stored in the stowed configuration 50. To use the wrench support tool to change a tire, remove the wing nut and bolt 33 from the hollow extension bar 20 such that the lift brackets 32 are free. Coupler 38 will then slip down and the hollow extension bar 20 is free to be removed from the frame 26.

Referring to FIGS. 1, 2 and 3, once the hollow extension bar 20 is free, adjust the height of left and right brackets 12a and 12b by loosening thumb bolts 15 and tightening them at the appropriate level such that the apertures 14 of the plate 18 align with the lug nuts 42 of the tire to be changed. It may be necessary to move the car so that each aperture of the moveable plate 18 aligns with a lug nut 42. The safety pins 30 may then be inserted into one of safety pin holes 28 to ensure the left and right side brackets 12a and 12b do not move.

Next, referring to FIG. 1, place one end of the lug wrench 70 on a lug nut 42, and the opposite end of the lug wrench 70 through an aperture 14 of the plate 18. The slot 34 of the hollow extension bar 20 is then placed over the opposing portion of the lug wrench 70. When force is applied downward on the hollow extension bar 20 the lug nut 42 is easily loosened.

As each aperture 14 aligns with a lug nut 42, each lug nut 42 may be loosened by simply moving the lug wrench 70 to the next lug nut 42 and corresponding aperture 14 of the plate 18, and the hollow extension bar 20 may be used as leverage to remove the lug nut 42.

The car is then jacked up, and the tire 40 is removed. Referring to FIG. 9, to place the spare tire 80 onto the axle, lift brackets 32 are installed by aligning the hole 31 (see FIG. 11) with upper screw holes 13a and 13b or lower screw holes 11a and 11b. The wrench support 10 is then placed on the ground with the arc 37 of the lift brackets 32 facing the ground, such that the hollow extension bar 20 can be placed under the lift brackets 32. The spare tire 80 is then placed on the wrench support 10, and foot pressure is applied to the opposite end of the frame 26 to lift the spare tire 80 onto the axle.

The lift brackets 32 are then removed from the frame 26 and the wrench support 10, lug wrench 70, and hollow extension bar 20 are used to tighten the lug nuts by placing the hollow extension bar 20 on the opposite side of the lug wrench 70 used to loosen the lug nuts. Referring to FIG. 6, the tool can then be reassembled to its original stowed configuration 50.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to the description. It is therefore contemplated that the appended claims will cover any such modifications or embodiments as fall within the true scope of the invention.

What is claimed is:

1. A tool for changing an automobile tire, said tool for use in conjunction with a lug wrench, the lug wrench having a socket for engaging lug nuts of the car tire, the socket formed on a first end of a straight member of the lug wrench, and a torque member transverse to the straight member for applying torque to the lug wrench, said tool comprising:

(a) a frame having parallel first and second straight portions, a top end and a base end, said first and second straight portions each having a plurality of corresponding spaced apart holes along their lengths, each of said holes operative to receive a pin; and (b) a plate slidably mounted to said first and second straight portions, said plate having a plurality of apertures arranged in a circular configuration corresponding to a configuration of the lug nuts of the tire, each of said apertures operative to receive a second end of the straight member of the lug wrench when the socket of the lug wrench is engaged with one of the lug nuts of the tire and said tool is placed on said base end, opposite a centerpoint of the tire, and at a distance not greater than the length of the straight member of the lug wrench, wherein said plate can be locked in position along said straight portions by insertion of one of said pins into one of the holes immediately below said plate on each of said straight portions.

2. The tire changing tool according to claim 1, wherein said plate is screwed to said first and second straight portions of said frame, said screw operative to lock said plate in place.

3. The tire changing tool according to claim 1, wherein said plate has five of said apertures.

4. The tire changing tool according to claim 1, further comprising a hollow extension bar having a slot at one end, said hollow extension bar operative to slidably receive said torque member, and said slot operative to engage a portion of said straight member proximate said torque member, said hollow extension bar operative to provide additional leverage.

5. The tire changing tool according to claim 4, further comprising at least one lift bracket couplable to said frame, said lift bracket operative to engage said hollow extension bar when said hollow extension bar is placed across said first and second straight portions, and wherein when said tool is placed horizontally on the ground with said hollow extension bar and said lift bracket on an underside of said tool, said extension bar acting as a fulcrum so that downward pressure at said top end of said frame results in upward movement of said base.

6. The tire changing tool according to claim 4, wherein said slot of said hollow extension bar is operative to engage said base of said frame, and an end of said hollow extension bar opposite said slot is removeably coupled to said top end of said frame such that said hollow extension bar is coupled to said frame when said tire changing tool is not in use.

7. The tire changing tool according to claim 6, wherein said lift brackets are couplable to said hollow extension bar such that said lift brackets are parallel to said frame when said tire changing tool is not in use.

8. The tire changing tool according to claim 1, wherein said base includes rubber pads.

9. The tire changing tool according to claim 1, wherein said base includes an ice penetrating pin.

10. A method for changing a tire of an automobile utilizing the tool according to claim 1, comprising:

(a) positioning said frame substantially vertically proximate to a tire to be changed;

(b) adjusting said plate so that said apertures are aligned with the lug nuts;

(c) locking said plate to said frame;

(d) placing the socket on one of the lug nuts and a second end of the straight member in a corresponding one of said plurality of apertures;

(e) removing the lug nut;

(f) repeating steps d–e for each of the lug nuts;

(g) placing said tool horizontally on the ground with a hollow elongated extension bar on an underside of said tool, and using a lift bracket coupled to said frame to engage said hollow elongated extension bar, said hollow elongated extension bar operative to act as a fulcrum;

(h) placing a replacement tire on said base end of said frame; and (i) placing downward pressure at said top end of said frame, wherein said downward pressure at said top of said frame will result in upward movement of said base;

wherein said upward movement is operative to lift said replacement tire back onto an axle of said automobile.

11. The method according to claim 10, wherein step (e) further comprises sliding said hollow elongated extension bar over said torque member such that said slot engages said straight member, said hollow extension bar operative to provide additional leverage to remove each of the lug nuts.

12. The method according to claim 10, when after step (i) further comprising steps:

(a) positioning said frame substantially vertically proximate to said axle of said automobile;

(b) placing the socket on one of the lug nuts and a second end of the straight member in a corresponding one of said plurality of apertures;

(c) tightening the lug nut; and (d) repeating steps b–c for each of the lug nuts.

13. The method according to claim 12, wherein prior to said tightening step further comprises sliding said hollow elongated extension bar over said torque member such that said slot engages said straight member, said hollow elongated extension bar operative to provide additional leverage to tighten each of the lug nuts.

* * * * *